C. HASTINGS.
SUPPLEMENTAL TIRE FOR VEHICLE WHEELS.
APPLICATION FILED APR. 29, 1914.
1,102,914.
Patented July 7, 1914.
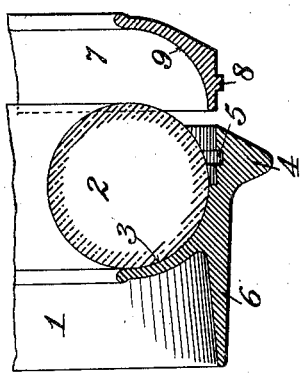
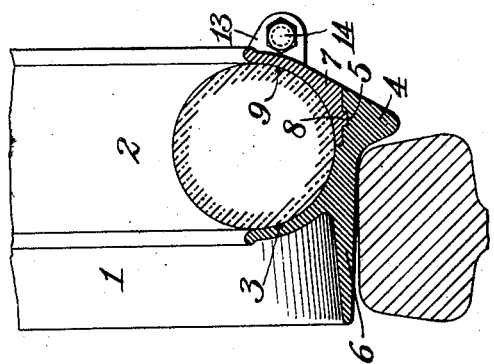
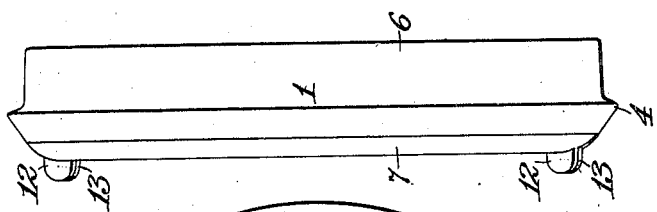
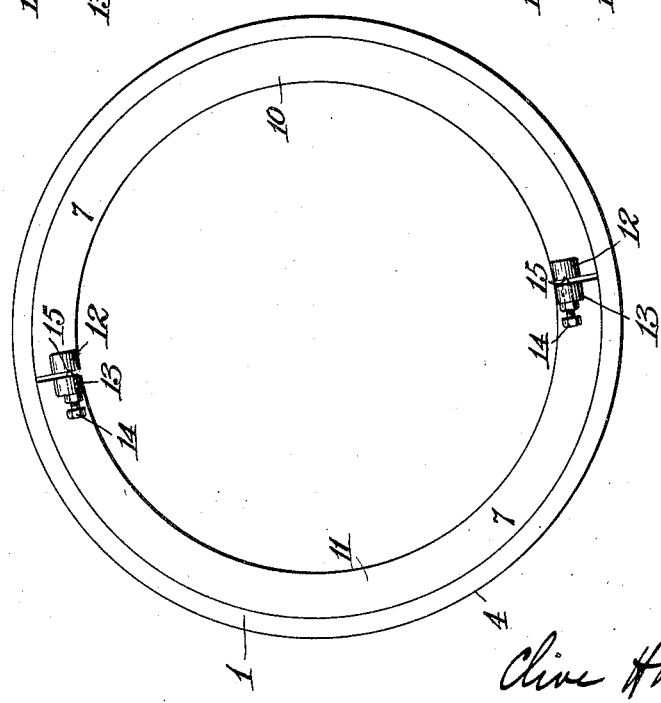
Witnesses
C. B. Bull
Charles Lowell Howard.
Inventor
Clive Hastings,
By G. H. W. T. Howard,
Attorneys

UNITED STATES PATENT OFFICE.

CLIVE HASTINGS, OF ATCHISON, KANSAS.

SUPPLEMENTAL TIRE FOR VEHICLE-WHEELS.

1,102,914.  Specification of Letters Patent.  Patented July 7, 1914.

Application filed April 29, 1914. Serial No. 835,184.

*To all whom it may concern:*

Be it known that I, CLIVE HASTINGS, a citizen of the United States, residing at Atchison, in the county of Atchison and State of Kansas, have invented new and useful Improvements in Supplemental Tires for Vehicle-Wheels, of which the following is a specification.

This invention relates to supplemental tires for vehicle wheels, and more particularly to wheels with pneumatic tires whereby the vehicle, such as an automobile, may be quickly and easily converted from its adaptation to ordinary road use so as to be applicable for use upon the rails of a railroad track.

The main object of my invention is to provide metal flange tires so constructed as to enable a railroad official, or other person, to attach the same quickly and securely to the wheels of an automobile and thereby adapt the vehicle for use upon railroad tracks, and after the run on the tracks has been made, to permit of the easy removal of the metallic flange tires so as to allow the automobile to continue its way over ordinary roads.

With this and other objects in view, the invention consists in the construction and novel combination and arrangement of parts hereinafter fully described, and illustrated in the accompanying drawing, it being understood that various changes in form, proportions, and minor details may be resorted to within the scope of the invention.

In the accompanying drawings, forming a part of this specification,—Figures 1 and 2 are, respectively, side and edge views of my invention. Figs. 3 and 4 are enlarged views in cross section.

In the construction shown, 1 represents an annulus of any suitable material, made in one piece, which may encircle the automobile tire 2 on the outside of the wheel. The greater part of the inner surface of the annulus 1 is curved as at 3, so that it shall substantially conform to the shape of the tire when the latter is inflated. The outer or tread surface of the annulus has a continuous flange 4 for engagement with the side of the railroad rail, and a portion 6, the outer surface of which is adapted to engage the top of the rail. It will be seen that the annulus 1, when placed upon the automobile tire, has the same function as the ordinary car wheel as far as the tread surface and flange are concerned.

I will now explain the preferred means by which the annulus 1 is held firmly upon the tire. Upon the inner surface of the annulus 1, and preferably directly over the flange 4, as shown in the drawings, is a groove 5 running continuously around the annulus. After the annulus has been placed upon the tire, an inner annulus 7, having a tongue 8, is changed from its position as shown in Fig. 4 to that represented in Fig. 3. By means of the tongue 8 and groove 5 the annulus 7 and annulus 1 with their inner curved surfaces 9 and 3, respectively, shaped to fit the inflated tire, will make a complete holding surface for the tire. Preferably the inner annulus 7 is composed of two sections, 10 and 11, although a greater number may be employed. Upon one of the sections of the annulus 7 at its respective ends are lugs 12, and at the ends of the other section are lugs 13 bored out and tapped so as to permit a screw 14 to be run therethrough. After the sectional annulus 7 has been fitted upon the annulus 1, as shown in Fig. 3, the screws 14 are tightened up, and by means of the points 15, bearing against the lugs 12, the sections 10 and 11 of the annulus 7 are pushed apart, thus firmly pressing the tongue 8 into the groove 5. Thus it will be seen that the annulus 1 with its tread surface and flange, and the inner annulus 7, serve to make a strong metal tire for automobile wheels adapted for use upon railroad rails. The danger of the metal tire slipping off the automobile wheel is reduced to the minimum, and its simplicity of construction enables its attachment to or detachment from vehicle wheels to be made in a few minutes.

While I have herein shown and particularly described the preferred embodiment of my invention, I do not wish to be limited to the precise details of construction shown; but Having described my invention, I claim as new and desire to secure by Letters Patent:—

1. A supplemental tire for vehicle wheels comprising two separable members adapted to fit over the tread of the vehicle wheel tire, one of said members consisting of an annulus having a flange and a tread, and the other consisting of an annulus adapted to be attached to the aforesaid annulus, and means to clamp the said members together.

2. A supplemental tire for vehicle wheels comprising two separable members adapted to fit over the tread of the vehicle wheel tire, one of said members consisting of a one-part annulus having a flange and a tread, and the other consisting of a sectional annulus adapted to be attached to the aforesaid one-part annulus, and means to clamp said members together.

3. A supplemental tire for vehicle wheels comprising two separable members adapted to fit over the tread of the vehicle wheel tire, one of said members consisting of an annulus having a flange and a tread and a groove extending around its interior surface, and the other member consisting of an annulus with a tongue extending around its exterior surface, and means for forcing the two members together.

4. A supplemental tire for vehicle wheels comprising two separable members adapted to fit over the tread of a vehicle wheel tire, one of said members consisting of an annulus having a flange and a tread and a groove running around its interior surface and the other member consisting of a sectional annulus with a tongue running around its exterior surface, and means for forcing the two members together.

5. A supplemental tire for vehicle wheels comprising two separable members adapted to fit over the tread of the vehicle tire, one of said members consisting of an annulus having a flange and a tread and a groove running around its interior surface, and the other member consisting of a sectional annulus having a tongue running around its exterior surface, and means upon the sectional annulus for forcing said sections apart so as to make a firm tongue and groove connection between the two members when in engagement.

In testimony whereof I affix my signature in presence of two witnesses.

CLIVE HASTINGS.

Witnesses:
    CHAS. SEIP, Jr.,
    CHAS. C. SMITH.

Copies of this patent may be obtained for five cents each, by addressing the "Commissioner of Patents, Washington, D. C."